US006665671B2

(12) United States Patent
Coutant

(10) Patent No.: US 6,665,671 B2
(45) Date of Patent: Dec. 16, 2003

(54) SYSTEM AND METHOD FOR OPTIMIZATION OF SHARED DATA

(75) Inventor: Cary A. Coutant, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 09/826,273

(22) Filed: Apr. 4, 2001

(65) Prior Publication Data

US 2002/0147718 A1 Oct. 10, 2002

(51) Int. Cl.[7] ............................................... G06F 17/30
(52) U.S. Cl. ..................... 707/8; 707/104.1; 709/229; 711/213; 717/164
(58) Field of Search .......................... 707/1, 2, 3, 10, 707/100, 8, 102, 104.1, 205; 709/229; 711/211, 212, 213; 712/209, 217, 218; 717/5, 139, 164, 152

(56) References Cited

U.S. PATENT DOCUMENTS

| | | | | |
|---|---|---|---|---|
| 4,943,913 A | * | 7/1990 | Clark | 711/206 |
| 5,428,758 A | * | 6/1995 | Salsburg | 711/165 |
| 5,517,628 A | * | 5/1996 | Morrison et al. | 712/234 |
| 5,737,536 A | * | 4/1998 | Herrmann et al. | 709/229 |
| 5,765,037 A | * | 6/1998 | Morrison et al. | 713/502 |
| 5,802,585 A | * | 9/1998 | Scales et al. | 711/154 |
| 5,898,872 A | * | 4/1999 | Richley | 717/121 |
| 5,950,228 A | * | 9/1999 | Scales et al. | 711/148 |
| 6,275,830 B1 | * | 8/2001 | Muthukkaruppan et al. | 707/200 |
| 6,332,214 B1 | * | 12/2001 | Wu | 717/141 |
| 6,412,108 B1 | * | 6/2002 | Blandy et al. | 717/152 |
| 6,438,673 B1 | * | 8/2002 | Jourdan et al. | 711/213 |
| 6,499,137 B1 | * | 12/2002 | Hunt | 717/164 |
| 6,609,130 B1 | * | 8/2003 | Saulpaugh et al. | 707/102 |
| 6,615,340 B1 | * | 9/2003 | Wilmot, II | 712/209 |
| 2002/0120601 A1 | * | 8/2002 | Elmendorf et al. | 707/1 |

OTHER PUBLICATIONS

Haddad, Emile "Optimal Allocation of Shared Data Over Distributed Memory Hierarchies", Proceedings of the Sixth International Parallel Processing Symposium, Mar. 23–26, 1992, IEEE, pp. 684–692.*

Vilayannur, M et al., "Kernel–Level Caching for Optimizing I/O by Exploiting Inter–Application Data Sharing", Proceedings of the IEEE International Conference on Cluster Computing (CLUSTER'02), Sep. 23–26, 2002, pp. 425–432.*

* cited by examiner

Primary Examiner—Shahid Alam

(57) ABSTRACT

A system and method are described for optimizing access of shared data. Briefly described, in architecture, the system can be implemented as follows. The data load optimization system includes a linkage table that contains at least one unresolved data module accessible by a computer program. The linkage table also includes a load determination logic that determines the location of the unresolved data module at load time of the computer program, and a load modification logic that modifies the load instruction in the computer program, at load time of the computer program, to directly load the unresolved data module at the location. The present invention can also be viewed as providing a method for efficiently accessing shared data. In this regard, the method can be broadly summarized by the following steps: (1) generating a linkage table for the computer program when a load instruction in the computer program loads an unresolved data that is not in a same load module as the computer program; (2) determining a location of the unresolved data at load time of the computer program; and (3) modifying the load instruction at load time of the computer program to directly load the unresolved data at the location.

20 Claims, 7 Drawing Sheets

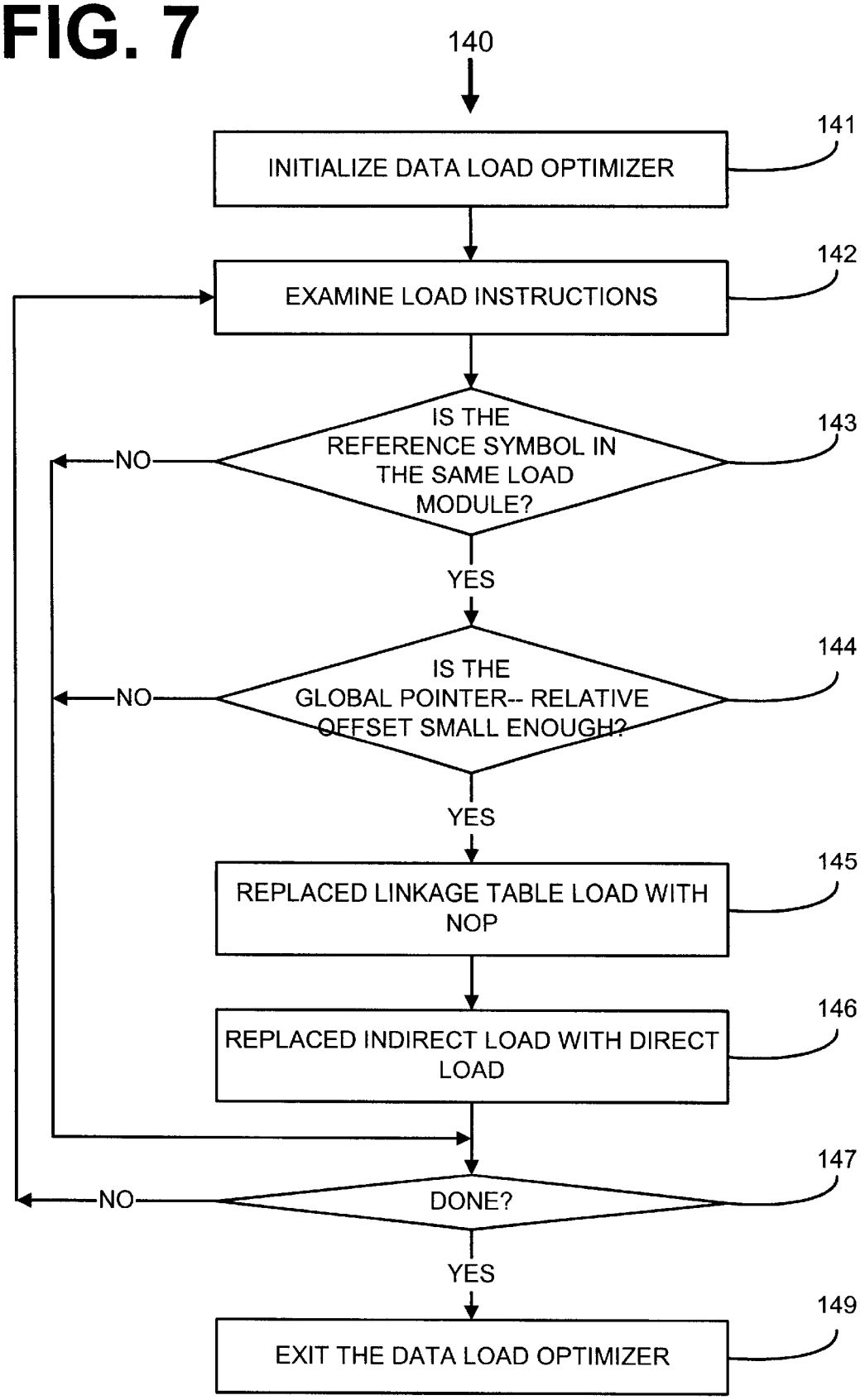

SYSTEM AND METHOD FOR OPTIMIZATION OF SHARED DATA

FIELD OF THE INVENTION

The present invention is generally related to computers and computer programs and, more particularly, is related to a system and method for optimizing the access to shared data.

DESCRIPTION OF RELATED ART

As is known in the computer and software arts, an executable file is typically composed of several separately compiled object modules and libraries. In the past, all of the code and data necessary to build an executable file was usually linked into one monolithic file. Nowadays, it is more likely that an executable file generated by a compiler and linker will be incomplete, requiring a plurality of shared libraries (or dynamically linked libraries in OS/2 and Windows parlance) and data files. The base executable program is linked together with any dependent shared libraries at load time to produce a complete program.

There are many advantages to the foregoing configuration and technique. In particular, common functionality, such as the standard input/output (I/O) facilities of the C language, for example, can be shared among all of the processes running on the system, rather than requiring that each have its own private copy. When a patch or bug fix is required for a routine within a shared library, the vendor can ship a new library, and all of the programs that depend on the library will automatically pick up the new code the next time they are executed, without the need for recompilation.

For remote code access, such as in a function call, a jump/branch instruction is used to transfer control from one point in the code to another. If the function being called is in a different load module, a new piece of code called the import stub can be used to serve as a local substitute for the real function (i.e. its purpose is to jump to the real function, and that import stub can be patched at load time with the actual address once the second load module has been loaded). Thus, there would be a cascaded jump (i.e. function A jumps to the import stub, which then immediately jumps to function B). Function calls typically accomplish this by using pc-relative (or ip-relative—same thing) addressing. The pc (program counter) or ip (instruction pointer) is the address of the current instruction. Then, the program code can jump from one point in the code to another simply by knowing the relative distance between the two places.

For remote data access, a load or store instruction is used to access an item of data in memory. If the item is in a different load module, an import stub can not be used (i.e., the import stub only works because it actually causes jumping to the import stub and transferring control). When loading or storing data, there is no transferring control to a new code block, the code control stays within the current code. Instead, the only choice is to have the compiler generate code that does an indirect access to the data, unless the compiler knows at compile time that the data will be in the same load module. Unfortunately, the remote data access technique comes with a performance penalty. Code accessing data areas within the same load module can be efficiently done because the complete physical layout of the data area is known at link time. Typically, the accessing code uses global pointer-relative addressing. However, access to remote data (i.e., dynamically-loaded library files) use more time-consuming instruction sequences, because the location of the remote data is not known until runtime.

Normally for function calls, the compiler makes the optimistic assumption that the function called is directly reachable. The import stub is provided at link time if that assumption proves false. However, for data accesses, the compiler makes the pessimistic assumption that the data to be accessed is in a different load module. This policy is necessary because cascaded loads are not possible in most architectures in the same way that cascaded jumps can be used to implement an import stub for a function call.

Heretofore, software developers have lacked a system and method for accessing shared data in a more efficient way.

SUMMARY OF THE INVENTION

The present invention provides a system and method for optimizing access of shared data. Briefly described, in architecture, the system can be implemented as follows. The data load optimization system includes a linkage table that contains at least one unresolved data module accessible by a computer program. The data load optimization system also includes a load determination logic that determines the location of the unresolved data module at load time of the computer program, and a load modification logic that modifies the load instruction in the computer program, at load time of the computer program, to directly load the unresolved data module at the location.

The present invention can also be viewed as providing a method for efficiently accessing shared data. In this regard, the method can be broadly summarized by the following steps: (1) generating a linkage table for the computer program when a load instruction in the computer program loads an unresolved data that is not in a same load module as the computer program; (2) determining a location of the unresolved data at load time of the computer program; and (3) modifying the load instruction at load time of the computer program to directly load the unresolved data at the location.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the drawings:

FIG. 7 is a flow chart of the data loader optimizer process that optimizes the access of shared data with a direct access to an external target as shown in FIG. 6.

DETAILED DESCRIPTION OF THE INVENTION

Figure 1:
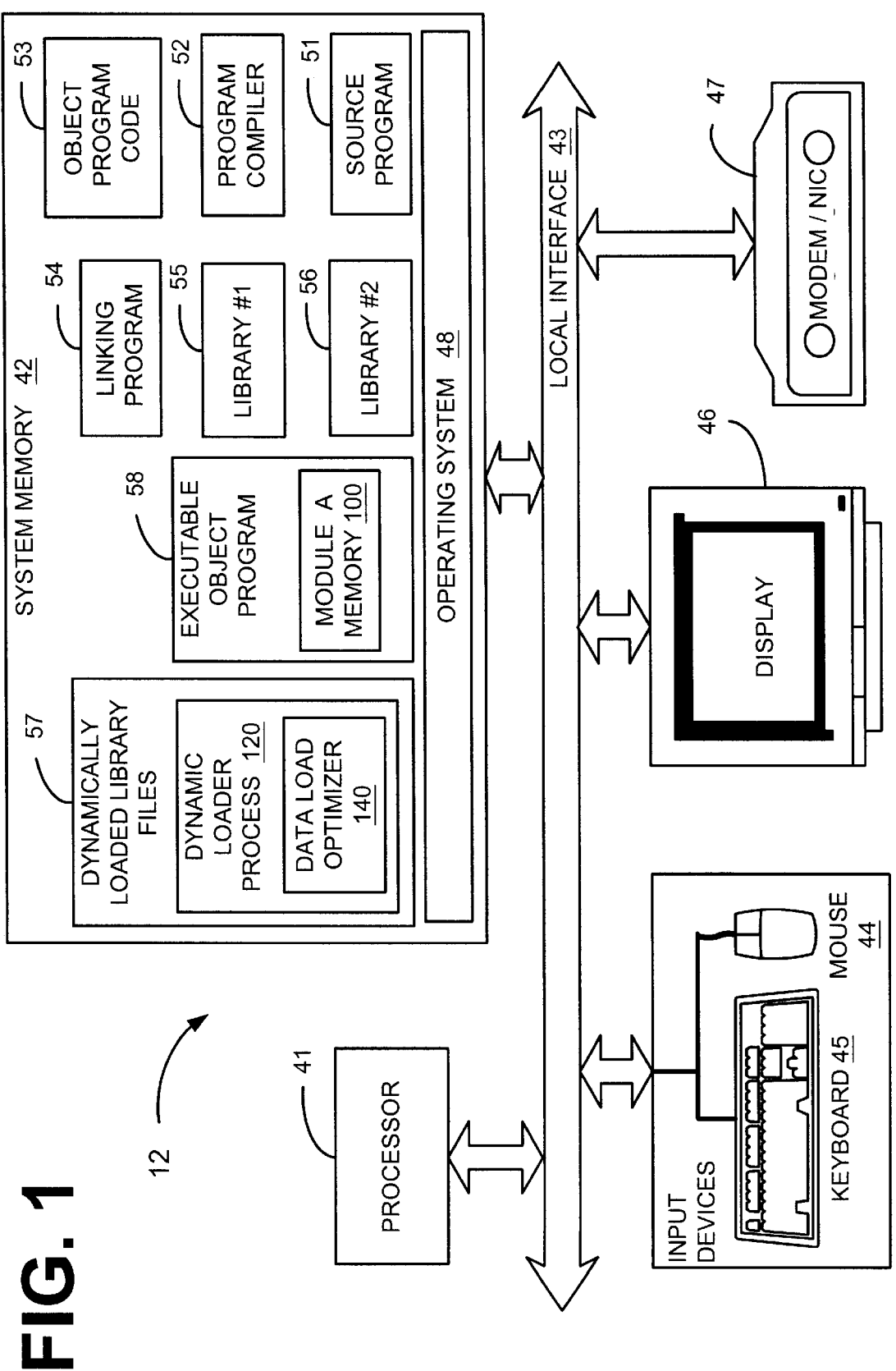
FIG. 1 is a block diagram of a user system showing a dynamic loader process with the data load optimizer of the present invention.

The present invention will now be described in detail with reference to the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

For remote code access, such as in a function call, a jump/branch instruction is used to transfer control from one point in the code to another. If the function being called is in a different load module, a new piece of code called the import stub can be used to serve as a local substitute for the real function (i.e. its purpose is to jump to the real function, and that import stub can be patched at load time with the actual address once the second load module has been loaded). Thus, there would be a cascaded jump (i.e. function A jumps to the import stub, which then immediately jumps to function B). Function calls typically accomplish this by using pc-relative (or ip-relative) addressing. The pc (program counter) or ip (instruction pointer) is the address of the current instruction. Then, the program code can jump from one point in the code to another simply by knowing the relative distance between the two places.

For remote data access, a load or store instruction is used to access an item of data in memory. If the item is in a different load module, an import stub can not be used (i.e. the import stub only works because it actually causes jumping to the import stub and transferring control). When loading or storing data, there is no transferring control to a new function, the code control stays within the current function. Instead, the only choice is to have the compiler generate code that always does an indirect access to the data.

In an indirect access, the generated code in function A to access a variable X in some arbitrary load module must first load a pointer to X from a linkage table located in function A's load module (i.e. because that's the only load module there is direct access to). Then, the code can use that pointer to load or store the actual location of variable X. In the prior art, the loader initializes all the pointers in the linkage table for data accesses at the same time that it patches any import stubs for function calls. The present invention deals with optimizing the accessing of shared data.

For data access, gp-relative addressing is used. The gp (global pointer) is a separate register in the processor that holds the address of the data segment that belongs to the current load module, that is, the load module to which the currently-executing code belongs. This allows each function to access its own data using a gp-relative address.

To access remote data from a different load module, however, the compiler knows neither the address of the data segment for that load module nor the gp-relative offset of the data item in that data segment—(i.e. those values are not known until the program is loaded). Therefore, a linkage table is created that holds a pointer to the data item the code is to access. The linkage table is placed in function A's own load module, so it can access the pointer just as it would any of its own data items. Then, the loader is notified that the linkage table needs to be patched at load time when it knows where the load module containing variable X is loaded, and what is the variable's offset within that load module's data segment.

Generally, in terms of hardware architecture, as shown in FIG. 1, the computer 12 includes a processor 41, memory 42, one or more input devices 45 & 45, and/or one or more output devices 46 that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU) or an auxiliary processor among several processors associated with the computer 12, and a semiconductor based microprocessor (in the form of a microchip) or a macroprocessor. Examples of suitable commercially available microprocessors are as follows: an 80x86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example of FIG. 1, the software in the memory 42 includes a suitable operating system (O/S) 48. A non-exhaustive list of examples of suitable commercially available operating systems 48 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 48 essentially controls the execution of other computer programs, such as but not limited to, the data load optimizer 140, dynamically loaded library files 57 and dynamic loader 120, and further provides scheduling, input-output control, file and data management, memory management, and communication control and related services.

The data load optimizer 140 may be a source program, executable program (object code), script, or any other entity comprising a set of instructions to be performed. When a source program, then the program is usually translated via a compiler, assembler, interpreter, or the like, which may or may not be included within the memory 42, so as to operate properly in connection with the O/S 48. Furthermore, the data load optimizer 140 in the dynamic loader 120 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices may include input devices, for example but not limited to, a keyboard 45, mouse 44, scanner, microphone, etc. Furthermore, the I/O devices may also include output devices, for example but not limited to, a printer, display 46, etc. Finally, the I/O devices may further include devices that communicate both inputs and outputs, for instance but not limited to, a modulator/demodulator 47 (modem; for accessing another device, system, or network), a radio frequency (RF) or other transceiver, a telephonic interface, a bridge, a router, etc.

If the computer 12 is a PC, workstation, or the like, the software in the memory 42 may further include a basic input output system (BIOS) (omitted for simplicity). The BIOS is a set of essential software routines that initialize and test hardware at startup, start the O/S 48, and support the transfer of data among the hardware devices. The BIOS is stored in ROM so that the BIOS can be executed when the computer 12 is activated.

When the computer 12 is in operation, the processor 41 is configured to execute software stored within the memory 42, to communicate data to and from the memory 42, and to generally control operations of the computer 12 pursuant to the software. The data load optimizer 140 in the dynamic loader 120 and the O/S 48 are read, in whole or in part, by the processor 41, perhaps buffered within the processor 41, and then executed.

When the data load optimizer 140 in the dynamic loader 120 is implemented in software, as is shown in FIG. 1, it should be noted that the data load optimizer 140 and dynamic loader 120 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The data load optimizer 140 and dynamic loader 120 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the data load optimizer 140 and dynamic loader 120 is implemented in hardware, the data load optimizer 140 and dynamic loader 120 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The source program 51 is processed by the program compiler 52. The program compiler 52 generates a compiled object program code 53. Compiled object program code 53 is further processed by the linking program 54 to produce an executable object program 58. The linking program 54 generates the executable object program 58, the linking program 52 must determine the offset to any access to remote code or data in first library 55, second library 56 and dynamic load library 57, or the like. When the linking program 54 discovers that a data module accessed is not within the same module as the compiled executable object program 58, the linking program 54 creates a linkage table to access the code or data. The linkage table contains pointers to the remote data. The first embodiment of the present invention involves a data load optimizer 140 that upon program load can dynamically patch (i.e., rewrite code in), the calling executable object program 58. This then enables access to the shared data directly instead of using indirect access through linkage table.

Figure 2:
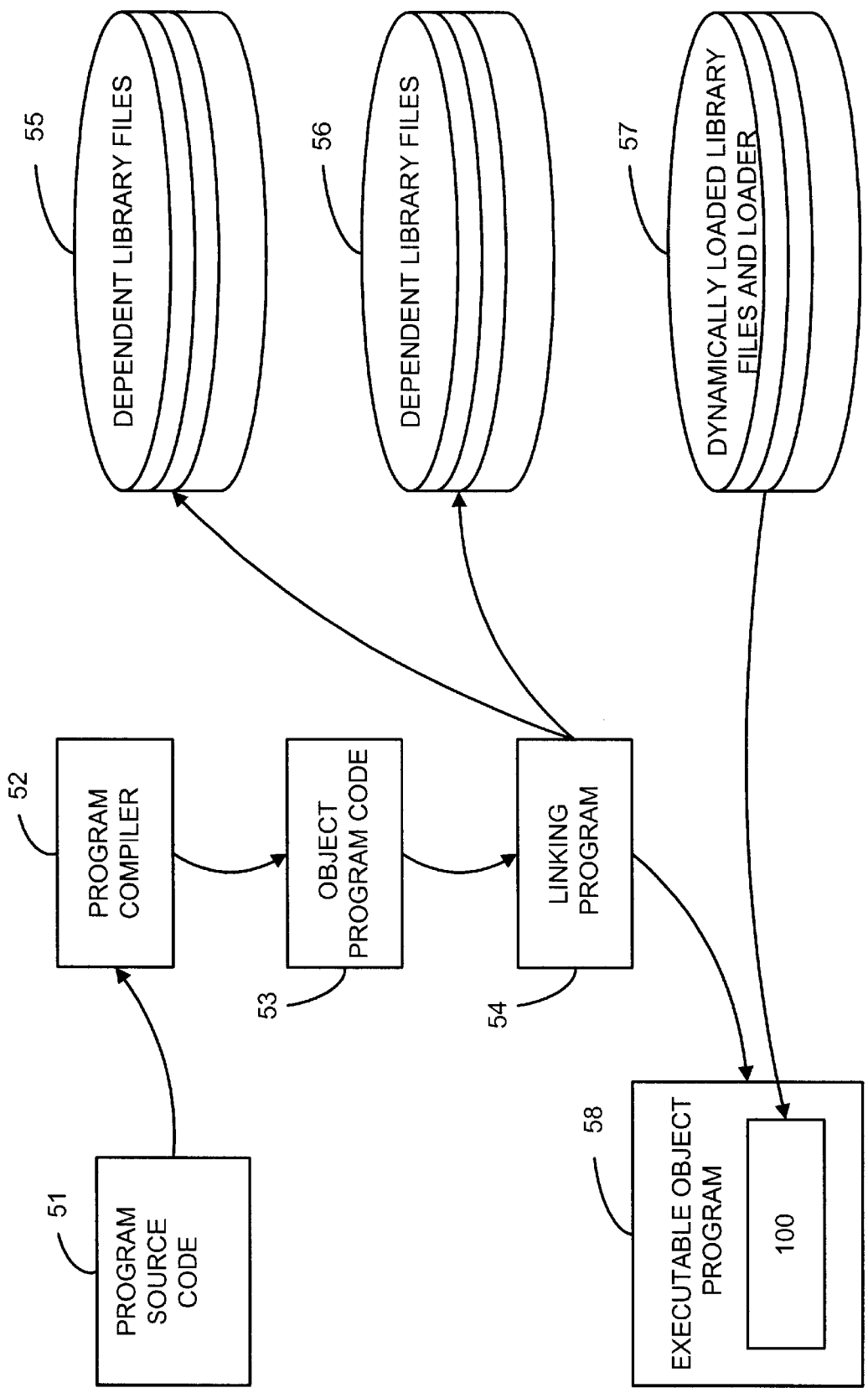
FIG. 2 is a block diagram of the process for optimizing access to share data in the object program code.

Illustrated in FIG. 2 is a diagram illustrating a process to convert a program source code 51 into an executable program object code 58 containing the modified shared data access feature of the present invention. The program source code 51 is input into the program compiler 52 to generate a compiled object program code 53 that is then processed by the program linker 54. The program compiler 52 lacking the location of dependent library files 55 and 56 and dynamically loaded library files 57 generates load code to be processed by the program linker 54 in order to determine the displacement from the program object code 58 to the dependent library files 55, 56, and 57.

The program linker 54 takes the unresolved load code in the compiled program object code 53 and determines their displacement to dependent files 55 and dependent files 56. The program compiler 52 of the present invention creates a linkage table that allows the program object code 58 to determine the shared data module at runtime. The utilization of these dynamically linked modules 57 are more expensive because of the relative placement of the caller module and the caller module are not known until runtime of the program object code 58.

The dynamically linked library files 57 are enabled by a dynamic loader 120. The dynamic loader 120 is a system component, which is responsible for collecting all of the necessary components of the program (executable file and libraries) at run time and laying them out in memory. It is also responsible for loading dynamically linked libraries 57 into memory as the running program requires them.

Figure 3:
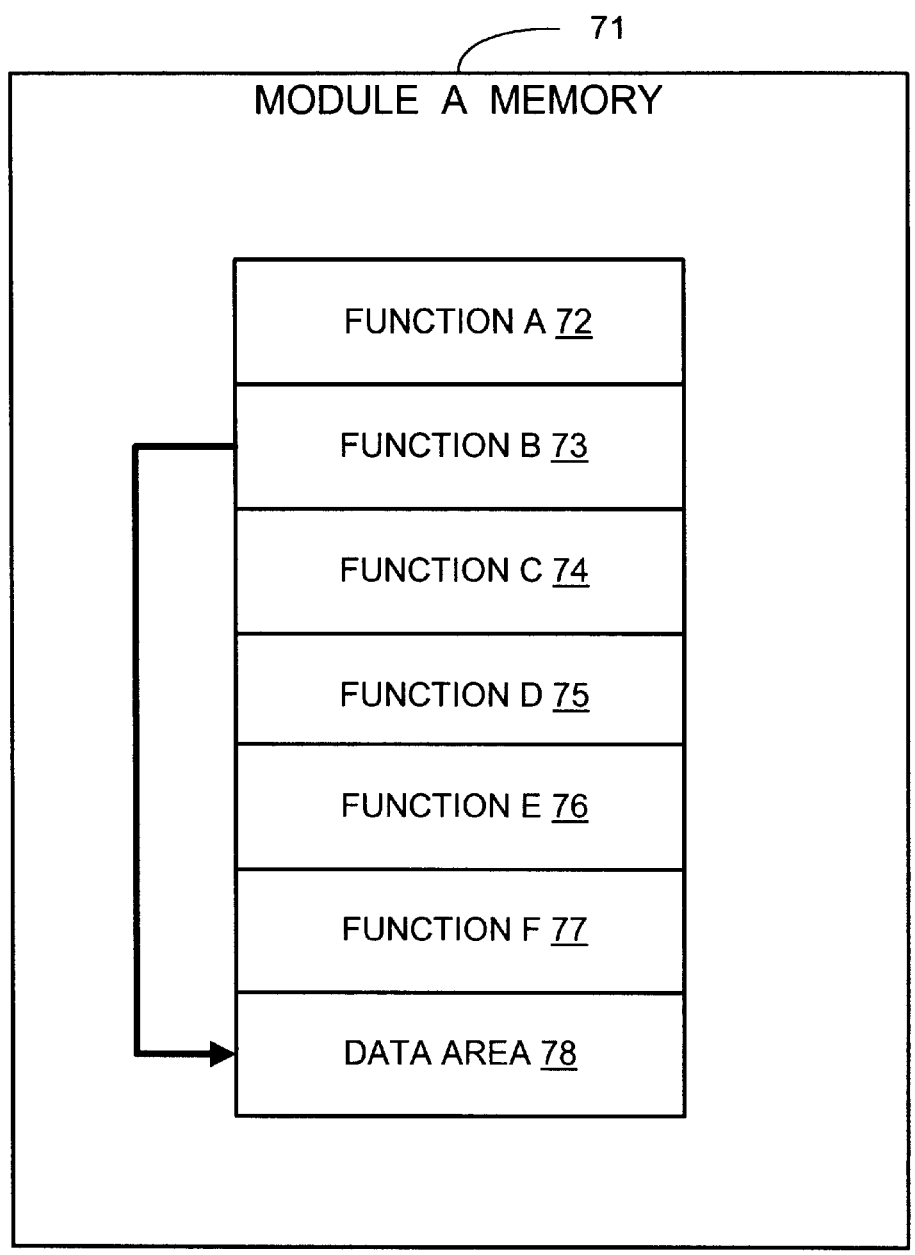
FIG. 3 is a block diagram of a known method for accessing data utilizing a direct GP relative access.

Illustrated in FIG. 3 is an example of a prior art methodology of performing a remote data access. In the prior art, a remote data access is actually reference within module A 71 from function B 73 to data area 78. The reference to data area 78 is actually encoded as a load or store instruction with a global pointer plus displacement, where the displacement is the distance from the global pointer to the target data item within data area 78. The call to data area 78 is actually encoded as a load with the program counter plus displacement, where the displacement is the distance from the program counter to the start of data area 78. This value is filled in by the linker program 54. The user is to note that this is a single step remote data access.

Figure 4:
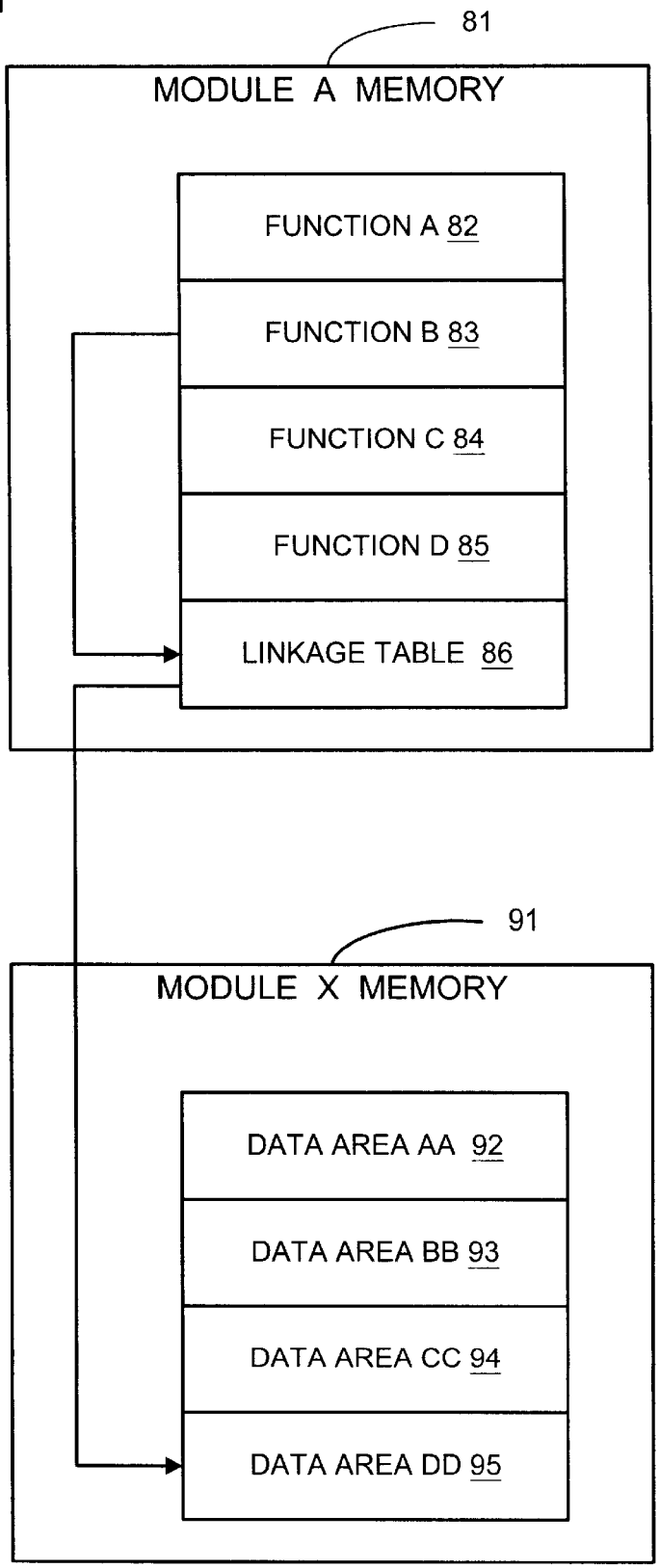
FIG. 4 is a block diagram of a known method for accessing data utilizing an indirect access.

Illustrated in FIG. 4 is the remote data access from module A 81 to module X 91 of the prior art. When function B 83 within module A 81 references data area DD 95 within module X 91, the function B 83 first references the linkage table 86 that was created by the linker program 54. The linkage table 86 then loads the remote data area DD 95 within module 91. The reference still utilizes the load as described in FIG. 3 using a load (global pointer plus displacement) from the linkage table 86. The linkage table 86 computes a second global pointer plus displacement to area DD 95 within module X 91. The displacement from linkage table 86 to remote data area DD 95 within module X 91 is known only to the dynamic loader that is noted above. This load from the linkage table 86 to the remote data area DD 95 within module X 91 is computed at load time. It should be noted that this is a two step data load for function B 83 to remote data area DD 95 with the intermediate step utilizing the linkage table 86.

Figure 5A:
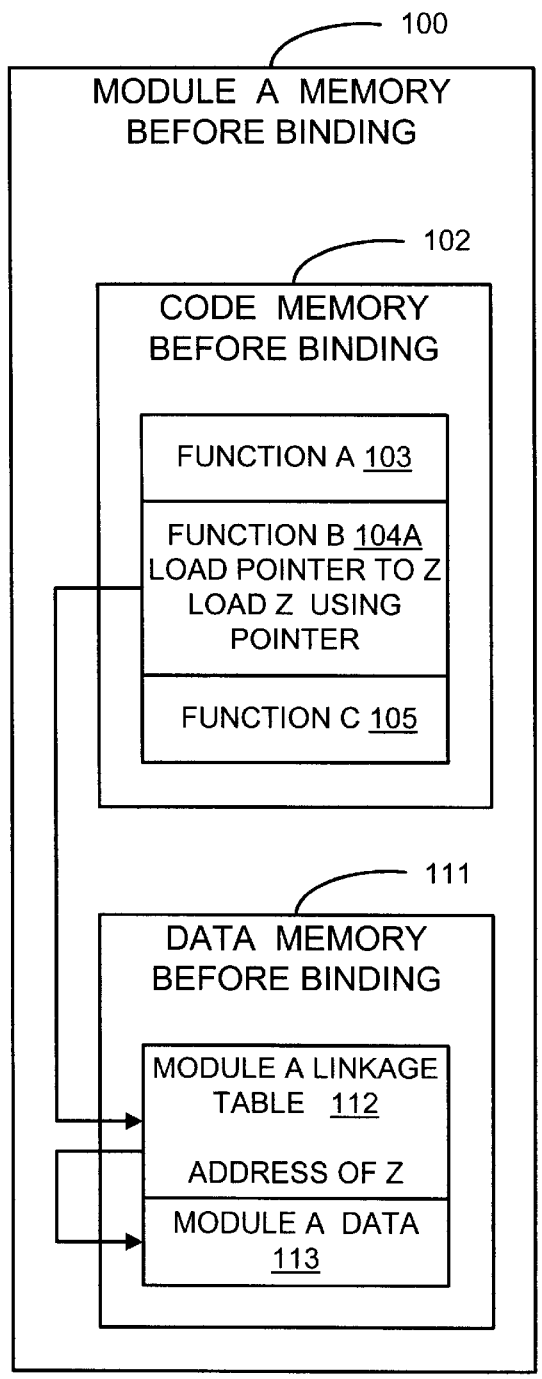
FIG. 5A is a block diagram of the present invention showing the data load optimizer access of share data as shown in FIGS. 1 and 2.
Figure 5B:
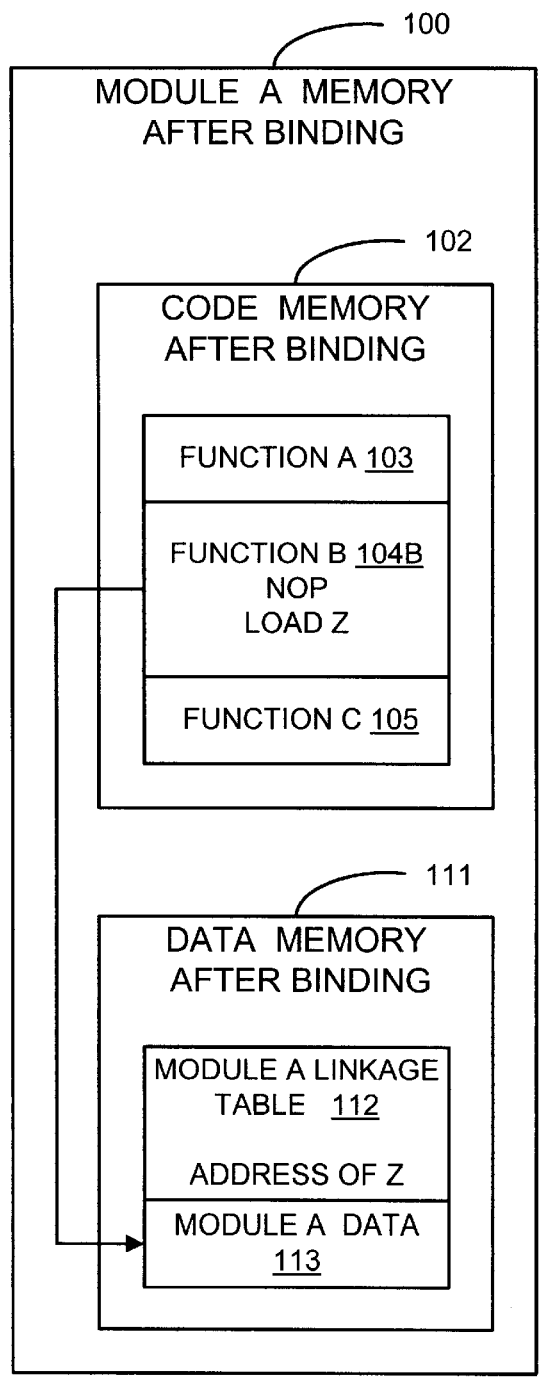
FIG. 5B is a block diagram of the present invention showing a direct load after utilizing the data load optimizer of the present invention as shown in FIGS. 1 and 2.

Illustrated in FIGS. 5A and 5B is the remote shared data access method of present invention. Shown in FIG. 5A is a snapshot of module A 102 prior at compile time. Function B 104A consists of a remote data load that calls the module a linkage table 112 that is in data module 111 to fix-up the a remote data load. The linkage table 112 contains the load fix-up and a branch to the remote module A data 113. The dynamic loader 57 (FIGS. 1 and 2), calculates the displacement between the module A linkage table 112 and the remote module A data 113 in data module 111. Once this displacement is computed, the data load optimizer 140 (FIG. 1) of the present invention, modifies the load instruction within function B 103 to include a load with an offset of the program counter plus the displacement to the module A linkage table 112.

Furthermore, the load of the displacement to module A linkage table modifies function B 104A to become function B 104B so that any loads by function B 104B from remote module A data 113 will be a direct single step load. This method is more efficient, since the displacement to the module A linkage table 112 can be set at compile time, and not at runtime. This avoids all the problems of rewriting code at load time. This also allows the remote module A data 113 to be changed at any time without constantly changing module A 102, thus providing more flexibility for the programmer.

Figure 6:
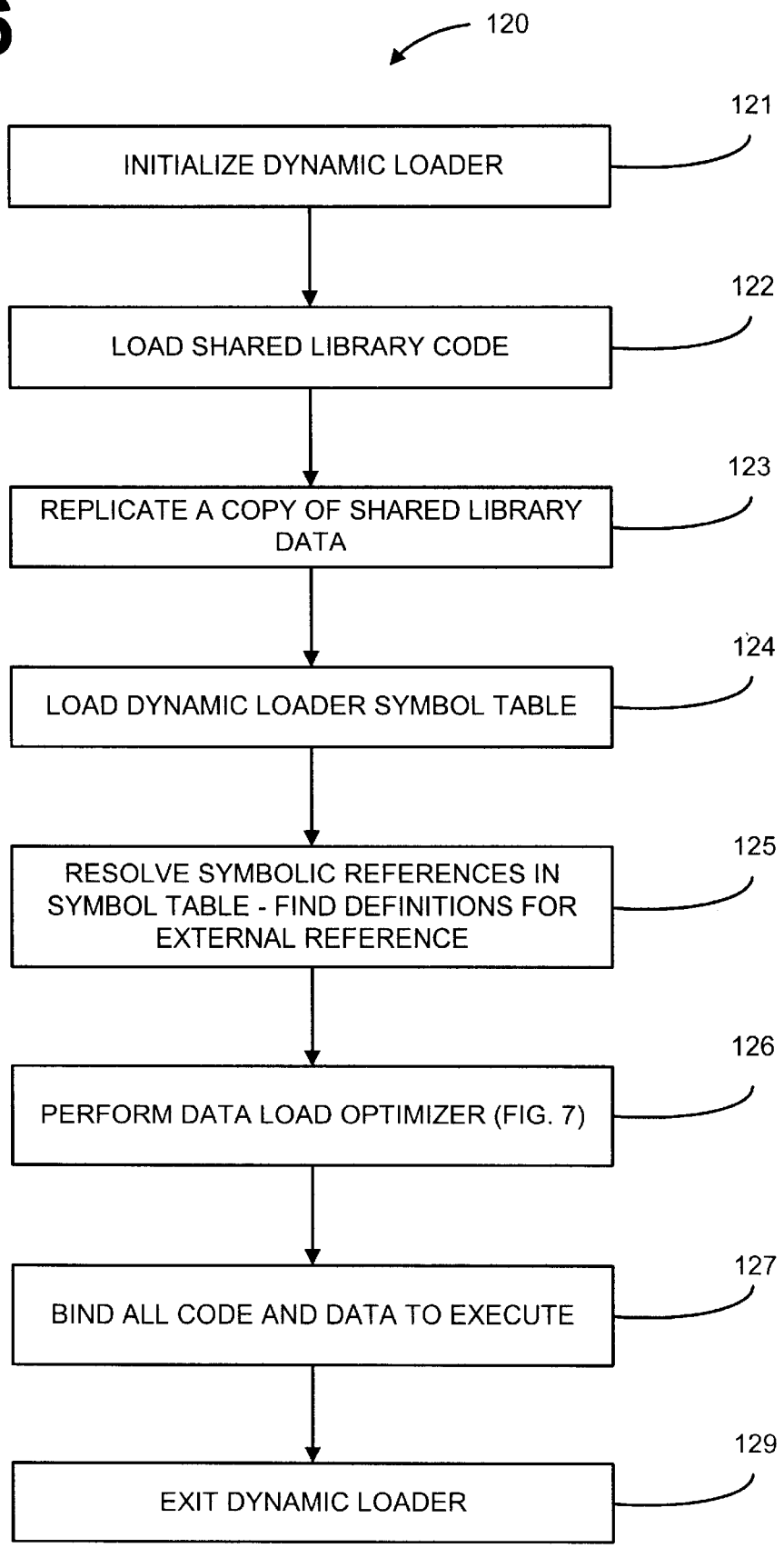
FIG. 6 is a flow chart of the preferred method to perform the dynamic loader process with the data load optimizer of the present invention as shown in FIGS. 1, 5A, and 5B.

Illustrated in FIG. 6 is a flow chart showing the architecture, functionality, and operation of the dynamic loader 120 that manages the data load optimizer 140 of the present invention, as shown in FIGS. 1, 2 and 5. First, the dynamic loader 120 is initialized at step 121. At step 122, the dynamic loader process loads the shared library code. The shared library data is then replicated at step 123. The dynamic loader process then loads the dynamic loader symbol table at step 124. At step 125, the dynamic loader 120 resolves the symbolic references in the symbol table.

The resolution of the symbolic references in the symbol table require the definitions for external references be found. At step 126, the data load optimizer is performed. The data load optimizer is herein defined in further detail with regard to FIG. 7. At step 127, the dynamic loader 120 then binds all the code and data together for execution. The dynamic loader 120 then exits at step 129.

FIG. 7 is a flow chart illustrating the architecture, functionality, and operation of the dynamic load optimizer process 140 of the present invention, as shown in FIGS. 1, 2, 5 and 6. First, the dynamic load optimizer 140 is initialized at step 141. At step 142, the data load optimizer 140 examines the load instructions. At step 143, the data load optimizer 140 then determines whether the reference symbol is in the same load module. If it is determined at step 143 that the reference symbol is not in the same load module, the data load optimizer 140 then skips to step 147. If it is determined that the reference symbol is in the same load module at step 143, the data load optimizer 140 then determines whether the reference symbol is located at a point whose offset relative to the global pointer is small enough. If it is determined that the global pointer relative offset is not small enough, the data load optimizer 140 then skips to step 147. However, if it is determined at step 144 that the global pointer relative offset is small enough to be handled by the current system architecture, the data load optimizer 140 then replaces the linkage table load with the no-op instruction at step 145. The indirect load instruction is then replaced with a direct load instruction at step 146.

At step 147, the data load optimizer 140 then determines whether there are more load instructions to be processed. If it is determined at step 147 that there are more load instructions to be processed, the data load optimizer 140 then returns to repeat steps 142 through 147. However, if it is determined at step 147 that the data load optimizer 140 is done, the data load optimizer 140 then exits at step 149.

The data load optimizer 140 is program code, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method to optimize dynamic data loads in a computer program, the method comprising the steps of:

providing a compiler-generated linkage table for the computer program when a load instruction in the computer program loads an unresolved data module that is not in a same load module as the computer program;

determining a location of the unresolved data module at load time of the computer program using said compiler-generated linkage table; and modifying the load instruction at the load time of the computer program to directly load the unresolved data module at the location, wherein said compiler-generated linkage table is set at compiler time by a program compiler, and wherein a linker program performs said determining and said modifying.

2. The method of claim 1, wherein the modifying step further comprises the steps of:

determining if the unresolved data module is an indirect data load; and calculating an offset to the location of the unresolved data module, when the load instruction is not the indirect data load.

3. The method of claim 2, wherein the modifying step further comprises the step of:

determining if the computer program has sufficient space to modify the load instruction, when the unresolved data module is not the indirect data load.

4. The method of claim 3, wherein the modifying step further comprises the step of:

replacing the load instruction with a direct load instruction to the unresolved data module if the computer program has sufficient space for the direct load instruction.

5. The method of claim 4, wherein the replacing step further comprises the step of:

using the offset to the location of the unresolved data module in the replacing of the direct load instruction.

6. A data load optimization system, comprising:

a compiler-generated linkage table that includes at least one unresolved data module accessible by a computer program;

a load determination logic that determines a location of an unresolved data module at load time of the computer program using said compiler-generated linkage table; and a load modification logic that modifies the load instruction in the computer program to directly load the unresolved data module at the location at load time of the computer program wherein said compiler-generated linkage table is set at compiler time by a program compiler, and wherein a linker program includes said load determination logic and said load modification logic.

7. The system of claim 6, wherein the load determination logic further comprises:

a unresolved data logic that determines if the unresolved data module is an indirect data load; and a calculation logic that calculates an offset to the location of the unresolved data module, when the load instruction is not the indirect data load.

8. The system of claim 6, wherein the load modification logic further comprises:

a space logic that determines if the computer program has sufficient space to modify the load instruction, when the unresolved data module is not the indirect data load.

9. The system of claim 8, wherein the load modification logic further comprises:

a replacement logic that replaces the load instruction in the computer program with a direct load instruction to the unresolved data module if the computer program has sufficient space for the direct load instruction.

10. The system of claim 9, wherein the replacement logic uses the offset to the location of the unresolved data module in the replacing of the direct load instruction.

11. A system to optimize dynamic data loads in a computer program, comprising:

compiler means for generating a linkage table for the computer program when a load instruction in the computer program loads an unresolved data module that is not in a same load module as the computer program;

linking means for determining a location of the unresolved data module at the load time of the computer program using said linkage table; and linking means for modifying the load instruction at the load time of the computer program to directly load the unresolved data module at the location.

12. The system of claim 11, wherein the modifying means further comprises:

means for determining if the unresolved data module is an indirect data load; and means for calculating an offset to the location of the unresolved data module, when the load instruction is not the indirect data load.

13. The system of claim 12, wherein the modifying means further comprises:

means for determining if the computer program has sufficient space to modify the load instruction, when the unresolved data module is not the indirect data load.

14. The system of claim 13, wherein the modifying means further comprises:

means for replacing the load instruction with a direct load instruction to the unresolved data module if the computer program has sufficient space for the direct load instruction.

15. The system of claim 14, wherein the replacing means uses the offset to the location of the unresolved data module in the replacing of the direct load instruction.

16. A computer readable medium for optimizing loading of shared data for a computer program, comprising:

compiler logic that generates a linkage table for the computer program when a load instruction in the computer program loads an unresolved data module that is not in a same load module as the computer program;

linking logic that determines a location of the unresolved data module at load time of the computer program using said linkage table; and linking logic that modifies the load instruction at the load time of the computer program to directly load the unresolved data module at the location.

17. The computer readable medium of claim 16, wherein the logic that modifies further comprises:

logic that determines if the unresolved data module is an indirect data load; and logic that calculates an offset to the location of the unresolved data module, when the load instruction is not the indirect data load.

18. The computer readable medium of claim 17, wherein the logic that modifies further comprises:

logic that determines if the computer program has sufficient space to modify the load instruction, when the unresolved data module is not the indirect data load.

19. The computer readable medium of claim 18, wherein the logic that modifies further comprises:

logic that replaces the load instruction with a direct load instruction to the unresolved data module if the computer program has sufficient space for the direct load instruction.

20. The computer readable medium of claim 19, wherein the logic that replaces uses the offset to the location of the unresolved data in replacing of the direct load instruction.

* * * * *